(No Model.)

W. H. EARLS.
SPITTOON.

No. 271,820. Patented Feb. 6, 1883.

WITNESSES
Morton Toulmin
J. B. Toulmin

INVENTOR
William H. Earls
N. W. Fitzgerald & Co.
Attorneys

UNITED STATES PATENT OFFICE.

WILLIAM H. EARLS, OF KALKASKA, MICHIGAN.

SPITTOON.

SPECIFICATION forming part of Letters Patent No. 271,820, dated February 6, 1883.

Application filed October 9, 1882. (No model.)

*To all whom it may concern:*

Be it known that I, WILLIAM H. EARLS, a citizen of the United States, residing at Kalkaska, in the county of Kalkaska, and State of Michigan, have invented certain new and useful Improvements in Spittoons; and I do hereby declare the following to be a full, clear, and exact description of the invention, such as will enable others skilled in the art to which it appertains to make and use the same.

This invention relates to improvements in spittoons of the description provided with casters, the object being the easy removal of the casters for cleaning or other purposes.

The nature of the invention is shown in the accompanying drawings, forming a part of this specification, in which—

Figure 1:
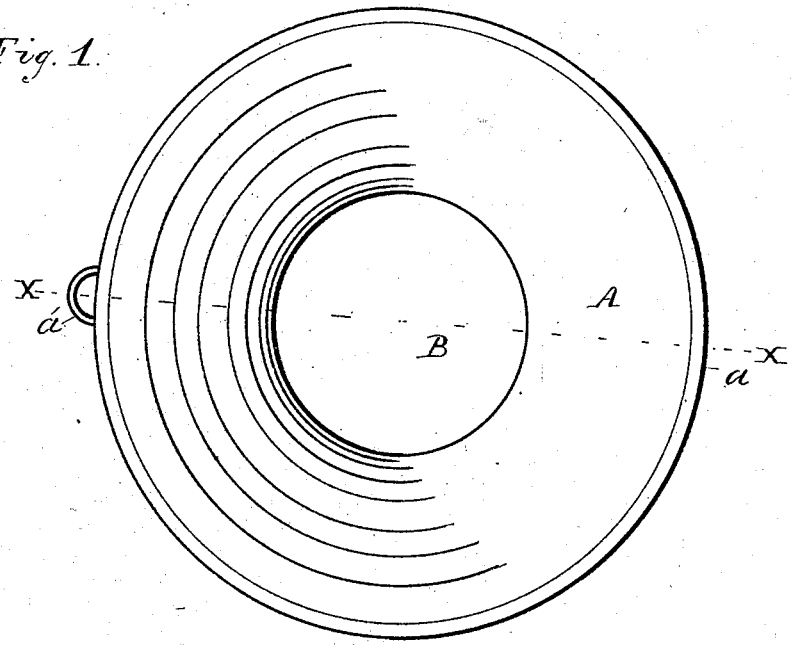
Figure 2:
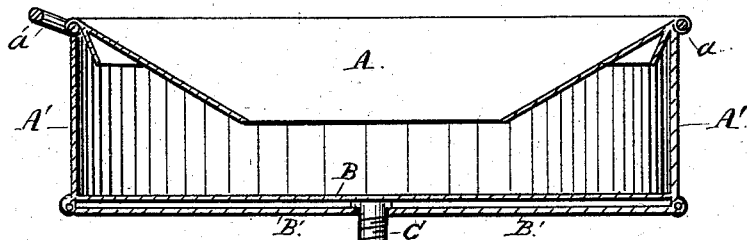
Figure 3:
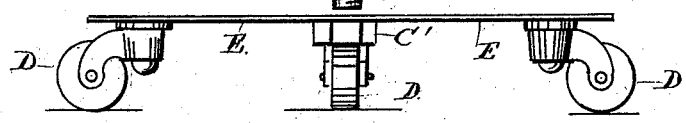
Figure 4:
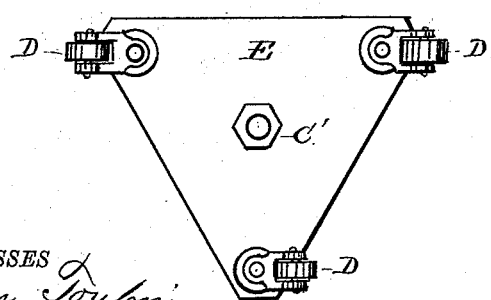

Figure 1 is a plan view. Fig. 2 is a section taken on the line $x\,x$ of Fig. 1. Fig. 3 is a side elevation of the platform, carrying the casters removed from the spittoon. Fig. 4 is a view of the platform with its casters, taken from the under side.

A is the cover of the spittoon, made in the usual form, having handle $a'$ and hinged at $a$.

A' are the sides of the spittoon, B the inner bottom, and B' an outer bottom. About the center of the lower bottom an opening or slot is made for the introduction of the stud C, which is firmly attached to the spittoon in any convenient manner by solder or otherwise. On the under side of the platform E is attached a nut, C', having the same thread as the stud C, onto which it is screwed to connect the platform and spittoon together. I make the platform of triangular shape, as that form gives the casters D three bearings on the floor and renders the spittoon more steady, providing it with casters D—one at each corner.

Having described my invention, what I desire to secure by Letters Patent and claim is—

1. In a spittoon, the stud C, in combination with triangular platform E, having nut C' and casters D, substantially as described, and for the purpose set forth.

2. A spittoon having inner bottom, B, and outer bottom, B', slotted near the center, and a platform, E, having nut C' and casters D, with the stud C, as shown and described, and for the purpose set forth.

In testimony whereof I affix my signature in presence of two witnesses.

WILLIAM H. EARLS.

Witnesses:
C. E. RAMSEY,
C. V. SELKIRK.